United States Patent

Macholdt et al.

[11] Patent Number: 5,502,118
[45] Date of Patent: Mar. 26, 1996

[54] POLYESTER SALTS AND THEIR USE AS CHARGE CONTROL AGENTS

[75] Inventors: Hans-Tobias Macholdt, Darmstadt; Rüdiger Bauer, Eppstein; Joachim Zöller, Mainz, all of Germany

[73] Assignee: Hoechst Aktiengesellschaft, Germany

[21] Appl. No.: 310,147

[22] Filed: Sep. 21, 1994

[30] Foreign Application Priority Data

Sep. 22, 1993 [DE] Germany ............... 43 32 170.4

[51] Int. Cl.$^6$ .................................................. C08F 20/00
[52] U.S. Cl. ................. 525/437; 528/272; 528/274; 528/287; 528/288; 528/289; 528/293; 528/295; 528/295.5; 528/296; 528/298; 528/300; 528/301; 528/302; 528/303; 528/306; 528/307; 528/308; 528/308.6; 430/110; 525/437; 525/445
[58] Field of Search ............... 528/272, 274, 528/287, 288, 289, 293, 295.295.5, 296, 298, 300, 301, 302, 303, 306, 307, 308, 308.6; 430/110; 525/437, 445; 524/81, 233

[56] References Cited

U.S. PATENT DOCUMENTS

| | | | |
|---|---|---|---|
| 4,565,845 | 1/1986 | Inoue et al. | 525/25 |
| 4,683,188 | 7/1987 | Suzuki et al. | 430/110 |
| 4,684,596 | 8/1987 | Bouser et al. | 430/110 |
| 4,789,614 | 12/1988 | Bugner et al. | 430/110 |
| 4,837,393 | 6/1989 | Alexandrovich et al. | 430/110 |
| 4,837,394 | 6/1989 | Alexandrovich et al. | 430/110 |
| 4,851,504 | 7/1989 | Suzuki et al. | 528/287 |
| 4,855,396 | 8/1989 | Wilson et al. | 528/272 |
| 5,069,994 | 12/1991 | Gitzel et al. | 430/110 |
| 5,187,038 | 2/1993 | Gitzel et al. | 430/110 |

*Primary Examiner*—Samuel A. Acquah
*Attorney, Agent, or Firm*—Connolly & Hutz

[57] ABSTRACT

Polymer salts whose anionic component is a polyester which comprises the product of reaction of the individual components a), b) and c) and if desired d) and if desired e), where a) is a dicarboxylic acid or a reactive derivative of a dicarboxylic acid, being free from sulfo groups, b) is a difunctional aromatic, aliphatic or cycloaliphatic sulfo compound whose functional groups are hydroxyl or carboxyl, or hydroxyl and carboxyl, c) is an aliphatic, cycloaliphatic or aromatic diol, a polyetherdiol or a polycarbonatediol, d) is a polyfunctional compound (functionality>2) whose functional groups are hydroxyl or carboxyl, or hydroxyl and carboxyl, and e) is a monocarboxylic acid and whose cationic component comprises hydrogen atoms, metal cations, substituted ammonium cations, immonium cations, guanidinium cations, phosphonium, arsonium or stibonium cations or a mixture of the abovementioned cations, are suitable as charge control agents and charge improvers in electrophotographic toners and developers, in triboelectrically or electrokinetically sprayable powder coatings, in electret materials and for the electrostatic separation of polymers and salt minerals.

19 Claims, No Drawings

POLYESTER SALTS AND THEIR USE AS CHARGE CONTROL AGENTS

DESCRIPTION

The present invention is in the technical field of charge control agents in toners and developers for electrophotographic recording processes, in powders and powder coatings for surface coating, in electret materials, especially in electret fibers, and in separation processes.

In electrophotographic recording processes a "latent charge image" is produced on a photoconductor. This "latent charge image" is developed by applying an electrostatically charged toner, which is then transferred to, for example, paper, textiles, foils or plastic and is fixed, for example by means of pressure, radiation, heat or the effect of solvent (L. B. Schein, "Electrophotography and Development Physics"; Springer Series in Electrophysics 14; Springer-Verlag, 1988).

One measure of the quality of a toner is its specific charge q/m (charge per unit mass). In addition to the sign and level of the electrostatic charge, the principal, decisive quality criteria are the rapid attainment of the desired charge level and the constancy of this charge over a relatively long activation period. In addition to this, the insensitivity of the toner to climatic effects, such as temperature and atmospheric humidity, is a further important criterion for its suitability.

Both positively and negatively chargeable toners are used in copiers and laser printers, depending on the type of process and type of apparatus.

To obtain electrophotographic toners or developers having either a positive or a negative charge, it is common to add so-called charge control agents. Since the charge of toner binders is generally heavily dependent on the activation period, the function of a charge control agent is, on the one hand, to set the sign and level of the toner charge and, on the other hand, to counteract the charge drift of the toner binder and to ensure a constant toner charge. Charge control agents which are not able to prevent the toner or developer showing a high charge drift (aging) during a prolonged period of use, and which may even cause the toner or developer to undergo charge inversion, are therefore unsuitable for use in practice.

Whereas black, blue or dark charge control agents can be employed for black toners, considerations of color mean that, for color toners, charge control agents without an inherent color are of particular interest.

In the case of full-color toners, in addition to the precisely defined requirements in terms of color, the three toners yellow, cyan and magenta must also be matched exactly to one another in terms of their triboelectric properties, since they are transferred in succession in the same apparatus.

It is known that colorants may in some cases have a sustained effect on the triboelectric charge of toners (H.-T. Macholdt, A. Sieber, Dyes & Pigments 9 (1988), 119–127). Because of the different triboelectric effects of colorants and the resulting effect, sometimes very pronounced, on toner chargeability, it is not possible simply to add the colorants to a toner base formulation made available at the start. On the contrary, it may be necessary to make available for each colorant an individual formulation, to which the nature and amount of the charge control agent required are tailored specifically.

Since this procedure is very laborious, highly effective, colorless charge control agents are required which are able to compensate for the different triboelectric characteristics of different colorants and to give the toner the desired charge. In this way, colorants which are very different triboelectrically can be employed in the various toners required (yellow, cyan, magenta and if desired black) using one and the same charge control agent, on the basis of a toner base formulation made available at the start.

Another important practical requirement is that the charge control agents should have high thermal stability and good dispersibility. Typical temperatures at which charge control agents are incorporated into the toner resins, when using kneaders or extruders, are between 100° C. and 200° C. Correspondingly, thermostability at 200° C., and better still at 250° C., is a great advantage. It is also important for the thermal stability to be ensured over a relatively long period (about 30 minutes) and in a variety of binder systems. This is significant because matrix effects occur again and again and lead to the premature decomposition of the charge control agent in the toner resin, causing the toner resin to turn a dark yellow or dark brown color and the charge control effect to be wholly or partly lost. Typical toner binders are resins made by addition and condensation polymerization, such as styrene, styrene-acrylate, styrene-butadiene, acrylate, polyester, phenolic and epoxy resins, individually or in combination, which may also contain further components such as colorants, waxes or flow assistants, or may have these components added subsequently. It is of great advantage for its good dispersibility if the charge control agent has, as far as possible, no wax-like properties, no tackiness, and a melting or softening point of >150° C., preferably >200° C. Tackiness frequently causes problems during metered addition to the toner formulation, and low melting or softening points may lead to inhomogenous distribution during dispersion, caused by the material coalescing in drops in the carrier material.

Apart from their use in electrophotographic toners and developers, charge control agents may also be used to improve the electrostatic charge of powders and coatings, especially in triboelectrically or electrokinetically sprayed powder coatings, as are used to coat surfaces of articles made from, for example, metal, wood, plastic, glass, ceramic, concrete, textile material, paper or rubber. Powder coating technology is used, for example, when coating small articles, such as garden furniture, camping equipment, household implements, automotive components, refrigerators and shelving, and for coating workplaces of complex shape. The powder coating or the powder receives its electrostatic charge, in general, by one of the two following processes:

a) in the corona process, the powder coating or the powder is guided past a charged corona and in so doing is charged;

b) in the triboelectric or electrokinetic process, the principle of frictional electricity is utilized.

In the spray apparatus, the powder coating or the powder receives an electrostatic charge which is opposite the charge of its friction partner, generally a hose or spray tube made, for example, from polytetrafluoroethylene. It is also possible to combine the two processes.

Typical powder coating resins employed are epoxy resins, polyester resins containing carboxyl and hydroxyl groups, polyurethane resins and acrylic resins, together with the conventional curing agents. Combinations of resins are also used. For example, epoxy resins are often employed in combination with polyester resins containing carboxyl and hydroxyl groups. Examples of typical curing agent components for epoxy resins are acid anhydrides, imidazoles and dicyandiamide, and derivatives thereof. Examples of typical curing components for polyester resins containing hydroxyl groups are acid anhydrides, blocked isocyanates, bisacylurethanes, phenolic resins and melamine resins. For polyester resins containing carboxyl groups, examples of typical curing agent components are triglycidyl isocyanurates or epoxy resins. Typical curing components used in acrylic resins are, for example, oxazolines, isocyanates, triglycidyl isocyanurates or dicarboxylic acids.

The disadvantage of insufficient charge can be seen above all in triboelectrically or electrokinetically sprayed powders and powder coatings which have been prepared on the basis of polyester resins, especially polyesters containing carboxyl groups, or on the basis of so-called mixed powders, also referred to as hybrid powders. Mixed powders are powder coatings whose resin base comprises a combination of epoxy resin and carboxyl group-containing polyester resin. Mixed powders form the basis of the powder coatings most commonly used in practice. Inadequate charging of the abovementioned powders and powder coatings results in inadequate throwing power and an inadequate deposition rate on the workpiece to be coated. The term "throwing power" is a measure of the extent to which a powder or powder coating is deposited on the workpiece to be coated including its rear faces, cavities, fissures and, in particular, its inner edges and angles.

In addition to this, it has been found that charge control agents may considerably improve the charging and the charge stability properties of electret materials, especially electret fibers (DE-A-43 21 289). Up to now, electret fibers have mainly been described in conjunction with the problem of ultrafine dust filtration (e.g. von Biermann, "Evaluation of permanently charged electrofibrous filters", 17th DOE Nuclear Air Cleaning Conference, Denver, U.S.A. (1982) and in Chemiefasern/Textilindustrie 40/92 (1990/9)). The filter materials described differ both in respect of the materials from which the fibers are made and with respect to the manner in which the electrostatic charge is applied to the fibers. Typical electret materials are based on polyolefins, halogenated polyolefins, polyacrylates, polyacrylonitriles, polystyrenes or fluorinated polymers, for example polyethylene, polypropylene, polytetrafluoroethylene and perfluorinated ethylene and propylene, or on polyesters, polycarbonates, polyamides, polyimides, polyetherketones, on polyarylene sulfides, especially polyphenylene sulfides, on polyacetals, cellulose esters, polyalkylene terephthalates and mixtures thereof. Electret materials, especially electret fibers, can be employed, for example, for (ultrafine) dust filtration. The electret materials may receive their charge in various ways, namely by corona charging or frictional charging.

Furthermore, it is known that charge control agents can be used in electrostatic separation processes, especially in processes for the separation of polymers. Hence, Y. Higashiyama et al. (J. Electrostatics 30, pp. 203–212 (1993)), using the example of the externally applied charge control agent trimethylphenylammoniumtetraphenylborate, describe how polymers can be separated from one another for recycling purposes. Without charge control agents, the triboelectric charging undergone by low density polyethylene (LDPE) and high density polyethylene (HDPE) is extremely similar. Following the addition of charge control agents, LDPE becomes highly positively charged while HDPE becomes highly negatively charged, making them easy to separate. In addition to the external application of the charge control agents, it is in principle also possible to conceive of incorporating these agents into the polymer in order, for example, to shift a polymer within the triboelectric voltage series and to obtain a corresponding separation effect. Likewise, it is possible in this way to separate other polymers from one another, for example polypropylene (PP) and/or polyethylene terephthalate (PET) and/or polyvinyl chloride (PVC).

In the same way, it is also possible to achieve particularly good selective separation of salt minerals, for example, if they have received beforehand an addition to their surface (surface conditioning) which improves the substrate-specific electrostatic charge (A. Singewald, L. Ernst, Zeitschrift für Physikal. Chem., New Series, Vol. 124, pp. 223–248 (1981)).

Charge control agents have been described in the literature in numerous references. However, the charge control agents known to date have a range of disadvantages which severely limit their use in practice or even render it impossible. For instance, charge control agents such as the heavy metal complexes described in U.S. Pat. No. 4,656,112, or the azines and nigrosines described in U.S. Pat. No. 5,281,709 cannot be employed in colored toners and in white or colored powder coatings because of their strong inherent color.

Colorless charge control agents based on ammonium and immonium compounds are often sensitive to light or mechanical effects (U.S. Pat. No. 4,683,188) and thermally labile, so that they form decomposition products which may have an adverse effect on the triboelectric charging of the toner (U.S. Pat. No. 4,684,596) and/or have a strong inherent color, often dark brown. In addition to this, they are often waxlike, and some are water-soluble and/or possess a low effectiveness as charge control agents.

Although suitable per se, charge control agents based on highly fluorinated ammonium and immonium compounds (U.S. Pat. No. 5,069,994) have the disadvantage of a complex synthesis, resulting in high preparation costs for the corresponding substances, and are not sufficiently stable to heat.

Charge control agents based on polymeric ammonium compounds U.S. Pat. No. 5,187,038 in some cases lead to an amine odor of the toner or developer, and the charge control characteristics of these substances can be altered by relatively mild oxidation and the absorption of moisture. Furthermore, the oxidation products are colored and consequently interfere, especially in color toners. The abovementioned charge control agents for electrophotographic toners and developers, because of their colored nature, are unsuitable for use in the predominantly white or clear triboelectrically or electrokinetically sprayed powders and powder coatings. In addition, inadequate thermal stability severely restricts the use of such charge control agents, since powder coatings, for example, are baked at over 200° C. for 15 minutes. The charge control agents intended for powders and powder coatings and claimed in U.S. Pat. No. 5,069,994 are difficult to handle because of their waxy nature and water-solubility or hygroscopic nature, and are of only limited applicability.

The ammonium compounds described in U.S. Pat. No. 5,069,994 and in U.S. Pat. No. 5,187,038 have the disadvantage that their thermal stability is too low, that they are not compatible with specific polyester resin systems, and that their price is high.

Ammonium salts based on sulfoisophthalic acid and derivatives thereof, as described for example in U.S. Pat. No. 4,789,614, again have the disadvantage of low stability in conventional binder systems. For example, incorporated in a concentration of 1% in a typical toner binder (styrene-acrylate or polyester), they exhibit marked yellowing after just a few minutes even at low temperatures (from 120° to 140° C.), making their use in practice impossible.

The sulfoisophthalic acid resins claimed in DE-A-40 37 518 have the disadvantage of only exhibiting a pronounced activity if they are employed as the dominant carrier component, in which case they lead to negatively charged systems whose charge is often unstable. In order to obtain charge stability or even to set a positive charge, additional charge control agent has to be added to the binder.

The object of the present invention was consequently to find improved, particularly effective, colorless charge control agents. In addition to the rapid attainment and constancy of the charge, the compounds should have a high thermal stability (decomposition temperature>200° C.) and should be insoluble or of low solubility in water. In addition, the preparation of the compounds should be inexpensive and relatively straightforward, with the avoidance where possible of organic solvents in the reaction medium.

Surprisingly, it has now become evident that certain polymer salts whose anionic component is a specific polyester possess good charge control properties and high thermal stability. In addition to this, these compounds are without an inherent color, are insoluble or of low solubility in water and can be prepared simply and inexpensively, with synthesis usually being possible in aqueous medium.

The present invention relates to the use of polymer salts whose anionic component is a polyester which comprises the product of reaction of the individual components a), b) and c) and if desired d) and if desired e), where a) is a dicarboxylic acid or a reactive derivative of a dicarboxylic acid, being free from sulfo groups, b) is a difunctional aromatic, aliphatic or cycloaliphatic sulfo compound whose functional groups are hydroxyl or carboxyl, or hydroxyl and carboxyl, c) is an aliphatic, cycloaliphatic or aromatic diol, a polyetherdiol or a polycarbonatediol, d) is a polyfunctional compound (functionality>2) whose functional groups are hydroxyl or carboxyl, or hydroxyl and carboxyl, and e) is a monocarboxylic acid and whose cationic component comprises hydrogen atoms, metal cations, substituted ammonium cations, immonium cations, guanidinium cations, phosphonium, arsonium or stibonium cations or a mixture of the abovementioned cations, as charge control agents and charge improvers in electrophotographic toners and developers, in triboelectrically or electrokinetically sprayable powders and powder coatings, and in electret materials.

Preferred polymer salts are those whose anionic component is a polyester which comprises the product of reaction of components a) to e), said components making up a) from 25 to 55 mol %, preferably from 40 to 50 mol %, b) from 0.1 to 15 mol %, preferably from 0.5 to 10 mol %, c) from 10 to 60 mol %, preferably from 30 to 55 mol %, d) from 0 to 40 mol %, preferably from 5 to 30 mol %, and e) from 0 to 20 mol %, preferably from 0 to 10 mol %, of the sum of monomers a) to e) (100 mol %).

The molar masses $M_n$ of the polyesters, which can be determined using gel permeation chromatography, are between 300 and 50,000, in particular between 500 and 10,000, and preferably between 800 and 5000.

In the sum of components a) to e), the ratio of the sum of hydroxyl equivalents to the sum of carboxyl equivalents is from 0.5 to 2.0. The term hydroxyl equivalent refers to the molar equivalent of hydroxyl groups.

The term carboxyl equivalent refers to the molar equivalent of carboxyl groups.

The content of free hydroxyl groups in the polyester is from 10 to 350, preferably from 100 to 250, mmol of OH/100 g of polyester. The content of free or neutralized acid groups, especially sulfo and carboxyl groups, is from 5 to 350, preferably from 9 to 120, mmol of COOH or of $SO_3H$/100 g of polyester.

The dicarboxylic acid component (a) of the polyester is preferably an aromatic, aliphatic or cycloaliphatic alkyl- or alkylenedicarboxylic acid, a dimeric fatty acid or a mixture of two or more of the abovementioned dicarboxylic acids.

Examples of these dicarboxylic acids are oxalic, malonic, glutaric, adipic, pimelic, azelaic, sebacic, fumaric, maleic and itaconic acid, 1,3-cyclopentanedicarboxylic acid, 1,2-cyclohexanedicarboxylic acid, 1,3-cyclohexanedicarboxylic acid, 1,4-cyclohexanedicarboxylic acid, phthalic, terephthalic and isophthalic acid, 2,5-norbornanedicarboxylic acid, 1,4-naphthalenedicarboxylic acid, biphenyldicarboxylic acid, 4,4'-sulfonyldibenzoic acid and 2,5-naphthalenedicarboxylic acid, and esters and anhydrides thereof.

Particularly preferred dicarboxylic acid components (a) are phthalic, isophthalic and terephthalic acid, phthalic anhydride, adipic acid, succinic acid, succinic anhydride, dimeric fatty acids, sebacic and azelaic acid, 1,3-cyclohexanedicarboxylic acid and glutaric acid and esters thereof.

Component (b) of the polyester is a difunctional, aromatic, cycloaliphatic or aliphatic compound containing reactive carboxyl and/or hydroxyl groups and containing at least one —$SO_3X$ group, where X is hydrogen or a metal ion, for example $Na^+$, $Li^+$, $K^+$, $MG^{2+}/2$, $Ca^{2+}/2$, $Cu^{2+}/2$ or a nitrogen-containing cation of an aliphatic, cycloaliphatic or aromatic compound, such as ammonia, triethylamine, dimethylethanolamine, diethanolamine, triethanolamine or pyridine. The sulfo groups are preferably attached to an aromatic ring, for example phenyl, naphthyl, biphenyl, methylenebiphenyl or anthryl. Examples of component b) are sulfoisophthalic acid, sulfoterephthalic acid, sulfophthalic acid, sulfosalicylic acid, sulfosuccinic acid and alkyl esters thereof, and a mixture of the abovementioned compounds. Particular preference is given to the sodium salts of sulfoisophthalic acid, dimethyl 5-sulfoisophthalate, sulfosalicylic acid and sulfosuccinic acid.

Component c) is an aliphatic, cycloaliphatic or aromatic glycol, a dihydroxy polyether or a polycarbonatediol. Examples of glycols are ethylene glycol, 1,2-propanediol, 1,3-propanediol, 2,2-dimethyl-1,3-propanediol, 1,3-butanediol, 1,4-butanediol, 1,5-pentanediol, 1,6-hexanediol, 2,2,4-trimethyl-1,6-hexanediol, 1,2-cyclohexanedimethanol, 1,3-cyclohexandimethanol, 1,4-cyclohexanedimethanol, 2,2'-bis(4-hydroxycyclohexyl)isopropane, p-xylylenediol, 2-ethylpropanediol and 2-butylpropanediol.

Appropriate dihydroxy polyethers are compounds of the formula

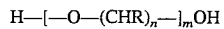

in which R is hydrogen or a $C_1$–$C_4$-alkyl radical, n is an integer from 2 to 6 and m is a number from 10 to 120, examples being poly(oxytetramethylene) glycols, poly(oxyethylene) glycols and poly(oxypropylene) glycols with molecular weights which are preferably in the range from 400 to 5000.

Appropriate polycarbonatediols are compounds of the formula

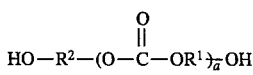

in which $R^1$ and $R^2$ independently of one another are a $C_1$–$C_{12}$-alkylene radical or a $C_5$–$C_{12}$-cycloalkylene radical and a is a number from 1 to 20. The polycarbonatediols can be prepared by reacting diols, such as propane-1,3-diol, butane-1,4-diol, hexane-1,6-diol, diethylene glycol, triethylene glycol, 1,4-bis(hydroxymethyl)cyclohexane, 2,2-bis(4-hydroxycyclohexyl)propane or neopentylgycol with dicarbonates, such as dimethyl, diethyl or diphenyl carbonate, or with phosgene. Mixtures of such diols can also be employed.

The polyfunctional component (d) preferably contains from 3 to 6 hydroxyl and/or carboxyl groups, being for example trimethylolpropane, trimethylolethane, glycerol, ditrimethylolpropane, pentaerythritol, dipentaerythritol, bishydroxyalkanecarboxylic acids, such as dimethylolpropionic acid, and trimellitic anhyride, a polyanhydride as described for example in DE-A-28 11 913, or a polycarbonatepolyol which is prepared, for example, by reacting trimethylolpropane or pentaerythritol with the abovementioned dicarbonates, or being a mixture of two or more of these compounds.

Suitable monofunctional carboxylic acids (e) are preferably saturated or unsaturated $C_{12}$–$C_{18}$ fatty acids such as captic acid, lauric acid, stearic acid, palmitic acid, linoleic acid and linolenic acid, or branched aliphatic $C_5$–$C_{10}$ carboxylic acids, such as isovaleric acid and isooctanoic acid.

A suitable cationic component is a diallylammonium cation of the formula (1)

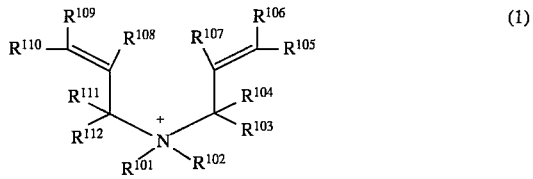

in which the radicals $R^{101}$ to $R^{112}$ independently of one another are each a hydrogen atom, halogen atom, a hydroxyl radical, an alkoxy radical, a primary, secondary or tertiary amino radical, a carboxylic acid or carboxylic ester radical, an acyl radical, a sulfonic acid or sulfonic ester radical, a cyano or nitro radical or a radical based on a $C_1$–$C_{30}$ aliphatic, $C_7$–$C_{60}$ araliphatic or $C_6$–$C_{30}$ aromatic hydrocarbon, which may be interrupted by heteroatoms.

Preferably, $R^{101}$ and $R^{102}$ are hydrogen atoms, straight-chain or branched, saturated or unsaturated alkyl ($C_1$–$C_{18}$) radicals, polyoxyalkylene radicals, preferably polyoxyethylene and/or polyoxypropylene radicals of the formula alkylene $(C_1$–$C_5)_q$-R', where R' is a hydrogen atom, an alkyl($C_1$–$C_4$) radical or an acyl radical, in particular the acetyl, benzoyl or naphthoyl radical, and q is a number from 1 to 10; or are phenyl, naphthyl or pyridyl radicals, tolyl radicals, aralkoxy radicals, especially methoxyphenyl; alkaryl radicals, especially benzyl, or cycloalkyl radicals, preferably cyclopentyl or cyclohexyl radicals, or in which the abovementioned radicals additionally contain one or more heteroatoms, preferably nitrogen, oxygen, sulfur, phosphorus or a combination thereof, or in which the abovementioned radicals are substituted by one or more carboxemide radicals, sulfonamide radicals, urethane radicals, keto radicals, primary, secondary or tertiary amino radicals, nitro radicals, ether radicals, especially alkylene ($C_2$–$C_4$)—O—alkyl ($C_1$–$C_4$), alkyl ($C_1$–$C_4$) radicals, alkoxy($C_1$–$C_4$) radicals, aroxy radicals, especially phenoxy radicals, haloalkyl($C_1$–$C_{30}$) radicals, haloalkoxy ($C_1$–$C_{30}$) radicals, ester radicals, especially —C(O)O-alkyl($C_1$–$C_4$), one or more halogen atoms, hydroxyl, carboxyl, sulfo, cyano or mercapto groups or by a combination thereof; or in which $R^{101}$ and $R^{102}$ together form a saturated or unsaturated, aromatic or nonaromatic, 5- to 7-membered ring system, preferably the pyridinium ring system, which may contain further heteroatoms, preferably nitrogen, oxygen, sulfur or a combination thereof, in the ring, in particular the morpholinium ring system, and the ring system may be substituted and/or modified by fusion with or bridging to other ring systems, and is in particular the quinolinium ring system.

The radicals $R^{103}$ to $R^{112}$ preferably have the definitions given above for $R^{101}$ and $R^{102}$ or are halogen atoms. Particularly preferred cations of the formula (1) are those in which $R^{101}$ and $R^{102}$ are each methyl and $R^{103}$ to $R^{112}$ are each a proton.

Also suitable as the cationic component is a homo- or copolymeric pyrrolidinium cation of the formula (2)

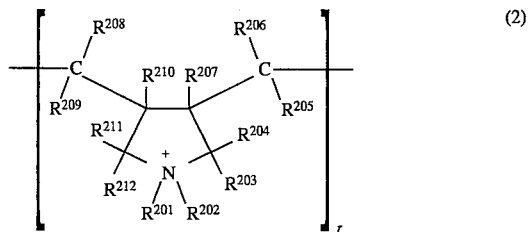

in which r has a value corresponding to molecular weights of between 500 and 1,000,000, preferably from 40,000 to 400,000, and where the radicals $R^{201}$ to $R^{212}$ have the definitions given for $R^{101}$ to $R^{112}$.

The preferred definitions of radicals $R^{201}$ and $R^{202}$ and those of radicals $R^{203}$ to $R^{212}$ correspond to the preferred definitions of radicals $R^{101}$ and $R^{102}$ and those of radicals $R^{103}$ to $R^{112}$.

Particularly preferred cations of the formula (2) are those in which $R^{201}$ and $R^{202}$ are methyl and $R^{203}$ to $R^{212}$ are each a proton.

Also suitable as cationic component is a homo- or copolymeric morpholinium or pyrrolidinium cation which is formed by cyclization of a diallylammonium cation of the formula (1) given above to form a six-membered or five-membered ring, and which is Joined together by one or more divalent radicals —$SO_2$— to form a polymer, the resulting polymer cations having a molecular weight of between 500 and 5,000,000 and the ratio of the number of diallylammonium cations to the number of divalent —$SO_2$— radicals being from 1:0.01 to 1:100.

A further suitable cationic component is a highly fluorinated ammonium ion of the formula (3)

in which at least one of the radicals $R^{301}$ to $R^{302}$ is a straight-chain fluorine-containing unsaturated and/or saturated alkyl radical of 4 to 30 carbon atoms, and not more than three of the radicals $R^{301}$ to $R^{304}$, independently of one another, are hydrogen or straight-chain or branched alkyl or hydroxyalkyl radicals of 1 to 30 carbon atoms.

With particular preference, at least one of the radicals $R^{301}$ and $R^{304}$ is the group —$CH_2$—CH=CF—Rf (Rf= $C_5F_{11}$–$C_{11}F_{23}$), the group —$CH_2$—CH=CF—$C_xF_{2x+1}$, where x is the number 5, 7 or 9, e.g. the group —$CH_2$—

CH=CF—C$_7$F$_{15}$, and not more than three of the radicals R$^{301}$ to R$^{304}$ independently of one another are a methyl, ethyl, butyl or hydroxyethyl group. Particularly preferred compounds of the formula (3) are those in which R$^{301}$ and R$^{302}$ are ethyl, R$^{303}$ is methyl and R$^{304}$ is R$_f$—CF=CH—CH$_2$—.

A further suitable cationic component is an immonium cation of the formula (4)

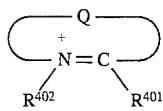 (4)

in which Q, together with the component —N=C—, is a mono- or polycyclic ring system of 4 to 17 carbon atoms which may additionally be interrupted by 1 to 4 heteroatoms and may contain 2 to 9 double bonds and which, in any desired position, may be substituted by fluorine, chlorine, bromine or iodine atoms, alkoxy(C$_1$–C$_6$), alkyl(C$_1$–C$_6$), nitro or amino groups, R$^{402}$ is a fluorine-containing alkyl(C$_1$–C$_{30}$) radical and R$^{401}$ is a hydrogen, fluorine, chlorine, bromine or iodine atom, an alkyl(C$_1$–C$_6$), alkoxy(C$_1$–C$_6$), nitro or amino group.

With particular preference Q forms, together with the component —N=C—, a pyridine, pyrazine or quinoline ring system and R$^{402}$ is a C$_8$F$_{17}$—CH$_2$—CH$_2$— group and R$^{401}$ is a hydrogen atom.

A further suitable cationic component is an immonium cation of the formula (4a)

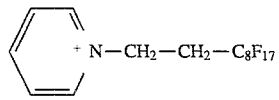 (4a)

The preparation of the ammonium and immonium compounds mentioned under formulae (3), (4) and (4a) is known per se from the literature and is described, for example, in DE 19 22 277, DE-A-22 44 297, DE 33 06 933, U.S. Pat. No. 3,535,381 and the literature cited therein.

A further suitable cationic component is a highly fluorinated phosphonium ion of the formula (5)

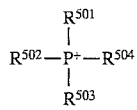 (5)

in which at least one of the radicals R$^{501}$ to R$^{504}$ is a straight-chain or branched, fluorine-substituted, saturated alkyl radical of 1 to 30 carbon atoms and 3 to 50 fluorine atoms, which may contain further halogen atoms, hydroxyl, chloromethyl, carboxamide, sulfonamide, urethane, keto, amino or R$^{505}$—O—R$^{506}$ groups, in which R$^{505}$ and R$^{506}$ are alkyl (C$_1$–C$_{30}$) radicals, or at least one of the radicals R$^{501}$ to R$^{504}$ is a fluorine-substituted aryl radical or an aralkyl radical whose aromatic ring system is substituted by fluorine, the aryl or aralkyl radical being possibly substituted on the aromatic ring system, in addition, by saturated or unsaturated, straight-chain or branched alkyl (C$_1$–C$_{30}$), alkoxy (C$_1$–C$_{30}$), haloalkyl (C$_1$–C$_{30}$), haloalkoxy (C$_1$–C$_{30}$) or hydroxyl groups or by further halogen atoms, and, in the case of an aralkyl radical, the alkyl bridge between phosphorus atom and aromatic ring contains 1 to 30 carbon atoms, and not more than three of the radicals R$^{501}$ to R$^{504}$ independently of one another are hydrogen atoms, straight-chain or branched, unsaturated or saturated, substituted or unsubstituted alkyl radicals of 1 to 30 carbon atoms or are aryl or aralkyl radicals which may be substituted in the aromatic ring system by alkyl (C$_1$–C$_{30}$), alkoxy (C$_1$–C$_{30}$), haloalkyl (C$_1$–C$_{30}$), haloalkoxy(C$_1$–C$_{30}$), or hydroxyl groups or by halogen atoms.

Particularly preferred compounds of the formula (5) are those in which R$^{504}$ is the group —CH$_2$—CH$_2$—C$_8$F$_{17}$ or —CH$_2$—CH$_2$—Rf (where Rf=C$_6$F$_{13}$ to C$_{11}$F$_{23}$), and not more than three of the radicals R$^{502}$ to R$^{504}$ are a phenyl radical, and in particular the compound in which R$^{501}$ is C$_8$F$_{17}$—CH$_2$—CH$_2$ and R$^{502}$ to R$^{504}$ are phenyl.

Also suitable as cationic component are cations of the formulae (6), (7) and (8)

 (6)

 (7)

 (8)

in which X is P, As or Sb and the radicals R$^{601}$ to R$^{604}$, R$^{701}$ to R$^{704}$ and R$^{801}$ are as defined for R$^{101}$ to R$^{112}$.

Also suitable as the cationic component are monovalent, divalent and trivalent metal cations, preferably Na$^+$, K$^+$, Ca$^{2+}$/2, Mg$^{2+}$/2, Cr$^{3+}$/3, Al$^{3+}$/3, Fe$^{2+}$/2, Fe$^{3+}$/3 and Zn$^{2+}$/2.

The preparation of the anionic polyester component is known per se and is described in numerous instances in the literature, for example in B. Vollmert, "Grundriss der Makromolekularen Chemie" [Outlines of Macromolecular Chemistry], E. Vollmert Verlag, Karlsruhe 1982.

If desired, in order to achieve as quantitative as possible a cocondensation of the monomeric sulfo compound (b), it may be necessary to carry out the synthesis of the described polyesters in a multistage process. For this purpose the reaction is first carried out, in the presence of catalysts of which examples are zinc acetate, phosphorous acid, antimony(III) oxide, lead(II) oxide and dibutyltin oxide, of all of the hydroxy-functional components with the monomeric sulfo compounds and, if desired, with a portion of the carboxyl-containing components, so that in the condensation 95% of the water of condensation calculated for a quantitative conversion can be removed by distillation. Subsequently, if appropriate, the remaining carboxylic acid components are reacted, condensation being continued up to the desired content of carboxylic acid equivalents.

If dicarboxylic or polycarboxylic acid anhydrides are used to introduce the anionic groups, then an OH-functional polyester is reacted with the anhydride to give the half-ester and condensation is then continued up to the desired acid number.

The cocondensation takes place at temperatures of between 140° C. and 240° C., preferably between 160° C. and 220° C. In order to avoid losses of glycol, the condensate is distilled via a distillation column. Preferred catalysts are organometallic compounds, especially compounds containing zinc, tin or titanium, examples being zinc acetate, dibutyltin oxide or tetrabutyl titanate. The quantity of catalyst is preferably from 0.1 to 1.5% by weight of the overall batch.

The acid groups may be introduced into the polyester by way of the individual components already in neutralized form. If free acid groups are present in the polyester, they may if desired be neutralized with aqueous solutions of alkali metal hydroxides or with amines, for example with trimethylamine, triethylamine, dimethylaniline, diethylaniline, triphenylamine, dimethylethanolamine, aminomethylpropanol, dimethylisopropanolamine or with ammonia.

The polyester can be isolated in bulk, but it is also possible to prepare a 50 to 95% solution with a water-miscible organic solvent. Suitable solvents for this purpose are preferably those containing oxygen, such as alcohols, ketones, esters and ethers, for example ethanol, n-propanol, isopropanol, isobutanol, butyl acetate and butylglycol, or solvents containing nitrogen such as N-methylpyrrolidone. The viscosity of these solutions at 60° C. is preferably between 0.5 and 40 Pa.s. This solution is then used to prepare a polyester dispersion containing from 15 to 65% by weight of polyester, from 0 to 30% by weight of organic solvent and from 35 to 85% by weight of water. The resulting pH is from 2 to 8.5, preferably from 4 to 8.

The preparation of the cationic components of formulae (1) to (8) is known from the literature. The preparation of the compounds of the formula (1) is described in CA-A-2 085 809 of those of formula (2) in CA-A-2 051 788 of the —$SO_2$— bridged homo- or copolymeric morpholinium or pyridinium cations in German Patent Application 43 02 644, of those of formulae (3) and (4) in U.S. Pat. No. 5,5053,357 and of those of formulae (5) to (8) in U.S. Pat. No. 5,055,619.

The preparation of the polymer salts according to the invention is carried out by reacting the above-described polyester dispersion, or an acidic, basic or neutral aqueous solution of the polyester containing if desired up to 15% by weight, preferably up to 10% by weight of organic solvent, preferably alcohols such as butanol, with an acidic, basic or neutral aqueous solution of the desired cationic component.

The ion exchange which takes place in the reaction may involve both protons and, if desired, monovalent counterions on the polyester, for example sodium ions.

The above-described preparation of the polymer salts can also be carried out, if desired, in organic solvents, preferably in water-miscible organic solvents such as dimethylformamide (DMF), acetone, dimethyl sulfoxide (DMSO), butylglycol or the alcohols described above. The organic solvents may also be employed as a mixture, if desired with water, as mentioned above.

The reaction product is usually precipitated from the reaction medium; in this context it may be necessary to concentrate and/or cool the solvent, or to heat the reaction medium in order to accelerate the reaction, although such heating must not exceed the boiling point of the solvent.

The polymer salts are purified by repeated, copious washing with water. Unreacted polymer is tested for by adding hydrochloric acid (about 2N); any unreacted metal cations are detected by the addition of base or by appropriate reagents, and excess ammonium, immonium or phosphonium cations are detected using aqueous sodium tetraphenylborate solution. Where it is possible to detect an unreacted component, washing is continued until this component is no longer detectable.

Drying is carried out to constant weight in a circulating-air oven under vacuum. Typical drying conditions are 60°–120° C. over 12–48 h at a vacuum of 100–600 mbar.

The invention also relates to the above-described polymer salts per se, with the exception of those whose cationic component is hydrogen.

The compounds according to the invention are colorless and possess particularly high and constant charge control properties, good thermal stabilities and very high dispersibilities.

A great technical advantage of these highly dispersible compounds is that they behave inertly with respect to the different binder systems and thus have a wide scope for possible application. In addition to their suitability in toners, as charge control agents and charge improvers they are also highly suitable in powders and coatings, especially powder coatings, in particular since they do not adversely affect (accelerate) the gel time in the thermal crosslinking of the powder coatings (baking).

With the compounds according to the invention, a very particular advantage is their less complicated synthesis, their inexpensive preparation and their high activity, excellent thermal stability and general resin compatibility. Particularly important as regards their use in industry is their very ready dispersibility, so that overall a high efficiency can be achieved.

For example, it is possible to demonstrate in test toners that the addition of 1% by weight of the compounds according to the invention enables the triboelectric chargeability to be controlled in very small steps.

For instance, a test toner containing 1% by weight of the calcium salt of polyester 1 has a constant negative charge (Application Example 5), whereas a test toner containing 1% by weight of an ammonium salt of polyester 4 has a capacity for positive charging (Application Example 8). The charge control effect is all the more marked when, in comparison thereto, the less rapid and less constant chargeability of the pure toner binder is taken into consideration (Comparative Example).

Likewise, the marked improvement in chargeability and the concomitant higher deposition ratio are very clearly visible in powder coating binders. Whereas the pure powder coating binder is virtually unchargeable (0.1 µA) and accordingly has a very low deposition ratio (5%) (Comparative Example), the addition of 1% by weight of the calcium salt of polyester 3 enables the chargeability to be improved to 0.9 µA and the deposition ratio to 70% (Application Example 15). The possibility of transferring these results to a polyester/epoxide hybrid powder coating system is demonstrated in Application Example 16 and the associated Comparative Example.

The polyester salts according to the invention are also suitable for use in electret materials, as shown in Application Example 21.

The compounds used according to the invention are incorporated, individually or in combination with one another and homogenously—for example by extrusion or kneading—a concentration of from 0.01 to 50 percent by weight, preferably from 0.1 to 5.0 percent by weight, based on the total mixture, into the binder of the respective toner, developer, coating material, powder coating, electret material or of the polymer to be separated electrostatically. In this context, the compounds employed according to the invention can be added as dried and ground powders, dispersions or solutions, filter cakes, masterbatches, as compounds coated from aqueous or nonaqueous solution onto appropriate carriers, for example silica gel, $TiO_2$ or $Al_2O_3$, or in some other form. Similarly, it is in principle also possible to add the compounds used according to the invention even during the preparation of the respective binders, i.e. in the course of their polymerization by an addition or condensation mechanism.

In the case of processes for the electrostatic separation of polymers, and especially of (salt) minerals, the charge control agents can also be applied—in the quantities indicated above—externally, i.e. to the surface of the material to be separated.

The level of the electrostatic charging of the electrophotographic toners or of the powder coatings in which the charge control agents according to the invention are homogenously incorporated is measured in standard test systems under constant conditions (identical dispersion times, identical particle size distribution, identical particle shape) at approximately 20° C. and 50% relative atmospheric humidity. The toner is electrostatically charged by being brought together turbulently on a roller bench (150 revolutions per minute) with a carrier, i.e. a standardized frictional partner (3 parts by weight of toner to 97 parts by weight of carrier). The electrostatic charge is then measured on a conventional q/m measurement setup (J. H. Dessauer, H. E. Clark, "Xerography and related Processes", Focal Press, N.Y., 1965, page 289; J. F. Hughes, "Electrostatic Powder Coating", Research Studies Press Ltd. Letchworth, Hertfordshire, England, 1984, Chapter 2). When determining the q/m value or the triboelectric charge of powder coatings, the particle size has a great influence, which is why strict attention is paid to a uniform particle size distribution when screen-classifying the samples of toner or powder coating obtained. For instance, a mean particle size of 10 μm is aimed at for toners, whereas for powder coatings a mean particle size of 50 μm is practicable.

The triboelectric spraying of the powders (powder coatings) is carried out using a spraying device having a standard spray pipe and a star-shaped inner rod at maximum powder throughput with a spray pressure of 3 bar. For this purpose, the article to be sprayed is suspended in a spraybooth and sprayed from a distance of about 20 cm directly from the front, without any further movement of the spraying device. The charge of each sprayed powder is then measured using a "device for measuring the triboelectric charge of powders" from Intec (Dortmund). To carry out the measurements, the antenna of the measuring device is held directly in the cloud of powder emerging from the spraying device. The current strength resulting from the electrostatic charge of powder coating or powder is displayed in μA. The deposition ratio is then determined, in %, by differential weighing of the sprayed and of the deposited powder coating.

The examples below are intended to illustrate the invention without limiting it to them. "min" denotes minutes and "h" denotes hours. The acid numbers (AN) were determined in accordance with DIN 53 402, the hydroxyl numbers (OHN) in accordance with DIN 53 783/53 240.

The differential thermal analysis (DTA) measurements were made on a DSC 12E instrument from Mettler using a heating rate of 3° C./min.

1. PREPARATION EXAMPLES 1.1 Anionic polyester component

The polyester synthesis is carried out in a 4 liter four-necked flask fitted with a packed column (column tube: 30 mm in diameter, 2000 mm in lengths packing: glass rings 6 mm in diameter and 6 mm in length) and an ascending distillation bridge, with temperature sensing of the reaction material under a protective-gas atmosphere (protective-gas supply, nitrogen). If low boiling alcohols, especially methanol, are distilled off as the condensate, the receiving vessel should be cooled using an ice bath.

1.1.1 Polyester 1

Stage 1:

450 g of neopentylglycol, 370 g of propylene glycol and 300 g of ethylene glycol are melted, 135 g of the sodium salt of dimethyl 5-sulfoisophthalate and 3.0 g of zinc acetate are added, and the mixture is heated so that the temperature at the head of the column does not exceed 65° C., and is condensed at about 190° C. until 29 g of distilled condensate have been collected.

Stage 2:

The batch is cooled to 140° C., 970 g of terephthalic acid and 930 g of isophthalic acid are added, and the mixture is heated such that the temperature at the head of the column does not exceed 100° C., and condensed at a temperature of up to 240° C. until 410 g of distillate are obtained and the content of free carboxyl groups has reached 15 mmol of COOH/100 g.

After cooling, the solidified residue is the desired product.

Color: light

AN: 14.2

Average molecular weight: about 3000 (gel permeation chromatography=GPC)

DTA: Sharp exothermic peak, beginning 360° C., maximum at 375° C.

Elemental analysis: Nitrogen content<0.01% by weight 1.1.2 Polyester 2

Stage 1:

580 g of neopentylglycol, 50 g of trimethylolpropane and 560 g of ethylene glycol are melted, 120 g of the sodium salt of 5-sulfoisophthalic acid and 3.0 g of zinc acetate are added, and the mixture is heated such that the temperature at the head of the column does not exceed 100° C., and is condensed at about 190° C. until 16 g of distilled condensate have been collected.

Stage 2:

The mixture is cooled to 140° C., 1040 g of terephthalic acid and 870 g of isophthalic acid are added, and the mixture is heated such that the temperature at the head of the column does not exceed 100° C., and is condensed at a temperature of up to 240° C. until 414 g of distillate are obtained and the content of free carboxyl groups has reached 25 mmol of COOH/100 g.

After cooling, the solidified residue is the desired product.

Color: light

AN: 19

1.1.3 Polyester 3

500 g of neopentyl glycol and 160 g of ethylene glycol are melted, 300 g of the sodium salt of 5-sulfoisophthalic acid, 600 g of terephthalic acid, 200 g of isophthalic acid and 3.0 g of zinc acetate are added, and the mixture is heated such that the temperature at the head of the column does not exceed 100° C., and is condensed at a temperature of up to 240° C. under a vacuum of 50 mbar until 214 g of distillate are obtained and the content of free carboxyl groups has reached 50 mmol of COOH/100 g.

After cooling, the solidified residue is the desired product.

Color: light

AN: 77

1.1.4 Polyester 4

Stage 1:

500 of neopentylglycol and 150 g of ethylene glycol are melted, 100 g of the sodium salt of 5-sulfoisophthalic acid, 600 g of terephthalic acid, 250 g of isophthalic acid and 3.0 g of zinc acetate are added, and the mixture is heated such that the temperature at the head of the column does not exceed 100° C., and is condensed at a temperature of up to 240° C. until 195 g of distillate are obtained and the content of free carboxyl groups has reached about 10 mmol of COOH/100 g.

Stage 2:

The batch is cooled to 120° C., 300 g of trimellitic anhydride are added, and the temperature is raised slowly to 160° C. After 3 hours and when the content of free carboxyl groups is about 190 mmol of COOH/100 g, the batch is emptied out.

After cooling, the solidified residue is the desired product.
Color: light
AN: 110
Average molecular weight: <1000 (GPC)
DTA: Sharp exothermic peak, beginning at 340° C., maximum at 350° C.

The polyesters can be transferred to the aqueous phase by swelling them at elevated temperature in a water-miscible solvent, for example butylglycol, butyldiglycol, N-methylpyrrolidone, methoxypropanol or acetone, and then adding the desired quantity of water. Polyester resins having a sulfonic acid number of greater than 15 can be dissolved directly in hot water which, if appropriate, has a pH>7.

Elemental Analysis
Nitrogen content: 0.01% by weight (KJeldahl method)
Chloride content: <0.3% by weight
Sodium content: 0.5% by weight 1.1.5 Polyester 5
Stage 1:
720 g of neopentylglycol and 420 g of ethylene glycol are melted, 90 g of the sodium salt of dimethyl 5-sulfoisophthalate and 3 g of zinc acetate are added, and the mixture is heated such that the temperature at the head of the column does not exceed 65° C., and is condensed at about 190° C. until 21 g of distillate are obtained.

Stage 2:
The batch is cooled to 140° C., 900 g of terephthalic acid and 1020 g of isophthalic acid are added, and the mixture is heated such that the temperature at the head of the column does not exceed 100° C., and is condensed at temperatures of up to about 240° C. under a vacuum of 10 mbar until 410 g of distillate are obtained and the content of free carboxyl groups has reached 6 mmol of COOH/100 g and the content of OH groups has reached about 40 mmol of OH/100 g.

Elemental Analysis
Calcium content: 0.001% by weight
Sodium content: 0.24% by weight
Nitrogen content: 0.01% by weight, Kjeldahl method 1.2 Polymer Salts
1.2.1 Salts of polyester 1 from Preparation Example 1.1.1
1.2.1.1 Poly(diallyldimethylammonium) Salt
20 g of polyester 1 are dissolved in 200 ml of dimethylformamide (DMF) and 250 ml of ice-water are quickly added (milky turbidity).

1.8 g of poly(diallyldimethylammonium) chloride (average molecular weight from 110,000 to 130,000) in the form of a 40% by weight solution are diluted with a further 75 ml of $H_2O$ and added dropwise to the initial charge. The product precipitates immediately and is stirred further. Subsequently the product is washed with water until free of ammonium compound and dried overnight at 60° C. under vacuum.
Yield: 20 g of white powder
N content: 3.5%

1.2.1.2 Calcium Salt
20 g of polyester 1 are dissolved in 200 ml of DMF, and 250 ml of $H_2O$ are added rapidly thereto. 2.5 g of 84% by weight $CaCl_2$ (Riedel-de Haan, No. 31216) in 100ml of $H_2O$ are added dropwise, and the mixture is subsequently stirred at 60° C. for 2 hours. The precipitate is filtered off with suction, washed with water until free of calcium and dried overnight at 60° C. under vacuum.
Yield: 18.3 g of a white powder
Calcium content: 0.26% by weight 1.2.1.3 Chromium Salt
62.5 g of a 32% by weight suspension of polyester 1 (suspension medium: water containing 8% by weight of butylglycol) are diluted with 400 g of ice-water. 1.5 g of $CrCl_3 \times 6H_2O$ are dissolved in 200 ml of $H_2O$ and added dropwise at 10° C. over a period of 30 min. The fine white-greenish precipitate is filtered off with suction, washed and dried overnight at 100° C. under vacuum.
Yield: 18.5 g of white-greenish powder
Residue on ignition at 800° C. (for 2 hours)=0.46%

1.2.1.4 Aluminum Salt
62.5 g of a 32% by weight suspension of polyester 1 (suspension medium: water containing 8% by weight of butylglycol) are diluted with 400 g of ice-water. 3.4 g of $Al_2(SO_4)_3 \times 18H_2O$ are dissolved in 200 ml of $H_2O$, adjusted to a pH of about 7 using sodium carbonate, and added dropwise at 10° C. The mixture is stirred overnight, and the light-colored precipitate is filtered off with suction, washed, and dried overnight at 100° C. under vacuum.
Yield: 16.8 g of a light-colored powder.

1.2.1.5 Guanidinium Salt
2.6 g of ®Dodigen 181-1 conc., Hoechst AG (78% by weight of $[R-NH(CH_2)_3-NH-C(NH_2)=NH]^{\oplus}$[acetate$^{\ominus}$ in aqueous medium, R=coconut-alkyl) are added to 800 ml of $H_2O$ and cooled to 10° C. 20 g of polyester 1 are dissolved in 200 ml of DMF and added dropwise to the initial charge over the course of 1 hour. The white precipitate is filtered off with suction, washed with copious ice-water and dried at 70° C. under vacuum for 48 hours.
Yield: 18.1 g of white powder
Nitrogen content: 0.7% by weight, KJeldahl method 1.2.2 Salts of Polyester 3 from Preparation Example 1.1.2
1.2.2.1 Calcium Salt
20 g of polyester 3 are stirred into 500 ml of $H_2O$, 20 ml of 2N sodium carbonate solution are added to adjust the pH to about 8, and the solid is dissolved with heating. The solution is filtered through a fluted filter, and then a solution of $CaCl_2$ saturated at a temperature of 40° C. (170 g of $CaCl_2$ granules, 84%, in 200 ml of $H_2O$) is added dropwise. After leaving the mixture to stand overnight at room temperature, the coarsely crystalline precipitate is filtered off with suction and washed with cold $H_2O$ until the washing water is free from calcium. The product is dried overnight under vacuum at 60° C.
Yield: 14.6 g of a white powder.

1.2.3 Salts of Polyester 4 from Preparation Example 1.1.4
1.2.3.1 Poly(diallyldimethylammonium) Salt
50 g of polyester resin 4 are dissolved in 1200 ml of $H_2O$ (50° C.) adjusted beforehand to a pH of about 8 using 2N sodium carbonate solution, and the resin solution is then cooled. 69 g of poly(diallyldimethylammonium) chloride (average molecular weight 100,000–130,000) are added dropwise in the form of a 40% by weight aqueous solution and the mixture is subsequently stirred for 4 hours. The precipitate is filtered off with suction, washed thoroughly with water, subjected to suction and dried overnight at 70° C. under vacuum.
Yield: 47 g of light-colored powder
Nitrogen content: 0.37% by weight (KJeldahl method)

1.2.3.2 Coconut fatty acid-alkyldimethylbenzylammonium salt
10 g of polyester 4 are dissolved in 250 ml of $H_2O$ which had been adjusted beforehand to a pH of 8 using 2N sodium carbonate solution. 22 g of a 50% by weight coconut fatty acid-alkyldimethylbenzylammonium (CDBA) chloride solution are diluted to 100 ml and are added dropwise to the polyester solution with stirring. Stirring is continued for 4 hours at 50° C. The product precipitates as a light-colored oily deposit. The viscous product is removed by decanting and is dried at 60° C. under vacuum for 48 hours.

Yield: 13.2 g of viscous, light-colored product.

1.2.3.3 Ditallowmethylhydroxypropylammonium salt 10 g of polyester 4 are suspended in 250 ml of $H_2O$ and the pH is adjusted to 8 using 2N sodium carbonate solution (dissolution).

22.1 g of a 75% by weight aqueous solution of ditallowmethylhydroxypropylammonium (DTHPA) chloride are diluted to 100 ml with $H_2O$ and are added dropwise to the polyester solution with stirring. Stirring is continued at 50° C. for 4 hours. A light-colored viscous product precipitates. The viscous product is removed by decanting and is dried at 60° C. under vacuum for 48 hours.

Yield: 11.7 g of viscous, yellowish product.

1.2.3.4 Aluminum salt 20 g of polyester 4 are dissolved in about 500 ml of which has been adjusted beforehand to a pH of 8 using sodium carbonate.

15 g of $Al_2(SO_4)_3 \times 18\ H_2O$ are dissolved in 200 ml of $H_2O$ and are added dropwise at 10° C. to the polyester solution, while stirring. A white precipitate is formed. The precipitate is filtered off with suction, washed and dried to constant weight under vacuum at 100° C. for 24 hours.

Yield: 22.4 g of white powder

AN: 19

Residue on ignition (800° C., 2 h): 6.2%

1.2.3.5 Iron Salt 20 g of polyester 4 are dissolved in 500 ml of $H_2O$ which has been adjusted to a pH of 7.5 beforehand using sodium carbonate solution.

5.5 g of $FeSO_4$ are dissolved in 25 ml of $H_2O$ and are added dropwise to the polyester solution at 10° C., while stirring. The mixture is subsequently heated briefly (5 min) to about 70° C., and a brown precipitate is formed which is filtered off with suction, washed and dried to constant weight under vacuum at 60° C. for 48 hours.

Yield: 18.3 g of a light brown powder

Residue on ignition (800° C./2 h): 11.4%

1.2.3.6 Zinc Salt 20 g of polyester 4 are dissolved in 500 ml of $H_2O$ which has been adjusted beforehand to a pH of 7.5 using sodium carbonate.

6.5 g of zinc acetate dihydrate are dissolved in 300 ml of $H_2O$ and are added dropwise to the polyester solution at 10° C. over a period of 30 min. A fine, tough precipitate is deposited. On heating briefly (5 min) to 70° C. the precipitate becomes more coarse. The precipitate is filtered off with suction, washed and dried to constant weight under vacuum at 60° C. for 48 h.

Yield: 18.6 g of light-colored powder

Residue on ignition (800° C./2 h): 10.2%

DTA: Exothermic peak, beginning at 305° C., maximum at 365° C.

1.2.3.7 Perfluoroammonium Salt 220 ml of a 35% by weight aqueous solution of $[(CH_3)(C_2H_5)_2N(CH_2-CH=CF(CF_2-CF_2)_nCF_3]^{(+)}$ $[CH_2O-SO_3]^{(-)}$ where N=2–5, which is an N—(1,1,2-trihydroperfluoralken-2-yl)-N,N-diethyl-N-methylammonium monomethyl sulfate, called F-quat for short, are diluted to 400 ml using $H_2O$ and adjusted to a pH of 7 using sodium carbonate.

This solution is added dropwise to a solution of 60 g of polyester 4 in 1500 ml of $H_2O$ which has been adjusted to a pH of 7 using sodium carbonate.

A precipitate which is initially white but later viscous and yellowish is deposited. It is washed thoroughly, removed by decanting, dissolved in acetone and then, by concentration, the product is obtained from acetone.

Yield: 98 g of a viscous yellowish product

Nitrogen content: 1.2% by weight, Kjeldahl method.

1.2.3.8 Perfluoroammonium salt 73 g of the F-quat described in Preparation Example 1.2.3.7 are dissolved in 700 ml of $H_2O$ and adjusted to a pH of 7 using sodium carbonate.

A solution of 20 g of polyester 4 in 200 ml of DMF is added dropwise to the F-quat solution at 10° C. over the course of 1 hour, with stirring.

The gray-white precipitate is filtered off with suction, washed copiously with water and dried to constant weight at 60° C. under vacuum for 24 hours.

Yield: 28.7 g of a gray-white powder

AN: 100

Nitrogen content: 1.0% by weight (KJeldahl method)

DTA: Sharp exothermic decomposition peak, beginning at 315° C., maximum at 365° C.

1.2.3.9 Poly(diallyldimethylammonium) salt 7 g of the poly(diallyldimethylammonium) chloride described in Preparation Example 1.2.3.1 are dissolved in 700 ml of $H_2O$. 20 g of polyester 4 dissolved in 200 ml of DMF are added dropwise to this solution at 10° C., with thorough stirring. The white precipitate is immediately filtered off with suction, washed, and dried to constant weight at 60° C. under vacuum for 24 hours.

Yield: 9.6 g of white powder

AN: 68

Nitrogen content: 0.5% by weight, KJeldahl method

1.2.3.10 Diallyldimethylammonium salt 6.5 g of diallyldimethylammonium chloride are dissolved in 700 ml of $H_2O$. 20 g of polyester 4 dissolved in 200 ml of DMF are added dropwise to this solution at 10° C. over the course of one hour, with thorough stirring. The white precipitate is filtered off with suction, washed, and dried to constant weight at 60° C. under vacuum for 24 h.

Yield: 14 g of white powder

1.2.3.11 Guanidinium salt 19 g of ®Dodigen 181-1 conc. (Hoechst AG) (78% by weight of $[R-NH(CH_2)_3-NH_2-C(NH_2)=NH]^{\oplus}[acetate]^{\ominus}$ in aqueous medium, R=coconut-alkyl) are placed in 800 ml of $H_2O$ and cooled to 10° C. 20 g of polyester 4 are dissolved in 200 ml of DMF and added dropwise over the course of 1 h. The white precipitate is filtered off with suction, washed (with copious amounts of ice-water) and dried at 70° C. under vacuum for 48 h.

Yield: 18.7 g of white powder

Nitrogen content: 5.5%, KJeldahl method

1.2.4 Calcium salt of polyester 5

90 g of calcium chloride are dissolved in 2000 ml of water at from 15° C. to 30° C., preferably at room temperature. 2250 g of a 32% by weight suspension of polyester 5 (suspension medium: water containing 5% by weight of butylglycol) are added to the $CaCl_2$ solution, with stirring, over the course of 40 min at from 15° to 30° C., preferably from 25° to 28° C.

A colorless precipitate is deposited, and stirring is continued at from 15° to 30° C., preferably 26° C., for from 0.5 to 2 h, preferably 1 h (test for excess calcium using oxalic acid). The precipitate is then filtered off on a suction filter, washed with portions of water totalling 2 liters until free from salt and butylglycol, when the conductivity is less than 1 mS/cm.

The product is dried under vacuum at 60° C. for 48 hours. (Alternatively, the solid can be isolated by spray-drying the suspension.)

Yield: 683 g of a light-colored powder

Calcium content: 0.26% by weight

Sodium content=0.01% by weight

Residual water content: 0.3%

DTA: Sharp exothermic peak, beginning at 320° C., maximum at 340° C.

Specific resistance: $10^{16}$ ohm$^{\oplus}$cm $\epsilon$: 2.8–3.5; tan delta: $1-5^{\oplus}10^{-2}$

2. APPLICATION EXAMPLES

Application Example 1

1.0 part of the compound from Preparation Example 1.1.1 (polyester 1) is incorporated homogenously using a header into 99.0 parts of a toner binder (styrene/methacrylate copolymer, 60:40) over 45 min. The mixture is then ground in a universal laboratory mill and subsequently classified in a centrifugal classifier. The desired particle fraction (4 to 25 μm) is activated with a carrier which comprises magnetite particles with a size of from 50 to 200 μm coated with styrene/methacrylate copolymer, 90:10 (90 μm Xerographic Carrier, Plasma Materials Inc., U.S.A.).

Measurement is carried out using a conventional q/m measurement setup. A screen with a mesh size of 25 μm is used to ensure that, when the toner is blown out, no carrier is ejected with it. Measurements are carried out at 50% relative atmospheric humidity. As a function of the activation period the following q/m values [μC/g] are measured:

| Activation period | Charge q/m [μC/g] |
| --- | --- |
| 10 min | −5 |
| 30 min | −11 |
| 2 h | −27 |
| 24 h | −50 |

Application Example 2

1.0 part of the compound from Preparation Example 1.1.3 (polyester 3) are incorporated and measured as described in Application Example 1.

| Activation period | Charge [μC/g] |
| --- | --- |
| 10 min | −5 |
| 30 min | −12 |
| 2 h | −23 |
| 24 h | −34 |

Application Example 3

1.0 part of the compound from Preparation Example 1.1.4 (polyester 4) are incorporated and measured as described in Application Example 1.

| Activation period | Charge [μC/g] |
| --- | --- |
| 10 min | −6 |
| 30 min | −13 |
| 2 h | −23 |
| 24 h | −26 |

Application Example 4

1.0 part of the compound from Preparation Example 1.2.1.1 (poly(diallyldimethylammonium) salt of polyester 1) are incorporated and measured as described in Application Example 1.

| Activation period | Charge [μC/g] |
| --- | --- |
| 10 min | −4 |
| 30 min | −8 |
| 2 h | −16 |
| 24 h | −36 |

Application Example 5

1.0 part of the compound from Preparation Example 1.2.1.2 (calcium salt of polyester 1) are incorporated and measured as described in Application Example 1.

| Activation period | Charge [μC/g] |
| --- | --- |
| 10 min | −14 |
| 30 min | −14 |
| 2 h | −16 |
| 24 h | −12 |

Application Example 6

1.0 part of the compound from Preparation Example 1.2.1.3 (chromium salt of polyester 1) are incorporated and measured as described in Application Example 1.

| Activation period | Charge [μC/g] |
| --- | --- |
| 10 min | −21 |
| 30 min | −23 |
| 2 h | −25 |
| 24 h | −29 |

Application Example 7

1.0 part of the compound from Preparation Example 1.2.3.1 (poly(diallyldimethylammonium) salt of polyester 4) are incorporated and measured as described in Application Example 1.

| Activation period | Charge [μC/g] |
| --- | --- |
| 10 min | −5 |
| 30 min | −10 |
| 2 h | −17 |
| 24 h | −25 |

Application Example 8

1.0 part of the compound from Preparation Example 1.2.3.3 (ditallowmethylhydroxypropylammonium salt of polyester 4) are incorporated and measured as described in Application Example 1.

| Activation period | Charge [μC/g] |
| --- | --- |
| 10 min | +6 |
| 30 min | +7 |
| 2 h | +7 |
| 24 h | +5 |

Application Example 9

1.0 part of the compound from Preparation Example 1.2.3.4 (aluminum salt of polyester 4) are incorporated and measured as described in Application Example 1.

| Activation period | Charge [μC/g] |
| --- | --- |
| 10 min | −8 |
| 30 min | −9 |
| 2 h | −17 |
| 24 h | −29 |

Application Example 10

1.0 part of the compound from Preparation Example 1.2.3.8 (perfluoroammonium salt of polyester 4) are incorporated and measured as described in Application Example 1.

| Activation period | Charge [μC/g] |
| --- | --- |
| 10 min | −11 |
| 30 min | −15 |
| 2 h | −21 |
| 24 h | −21 |

Application Example 11

1.0 part of the compound from Preparation Example 1.2.3.9 (poly(diallyldimethylammonium) salt of polyester 4) are incorporated and measured as described in Application Example 1.

| Activation period | Charge [μC/g] |
| --- | --- |
| 10 min | −13 |
| 30 min | −20 |
| 2 h | −25 |
| 24 h | −25 |

If 2.0 parts of the compound from Preparation Example 1.2.3.9 instead of 1.0 part are incorporated, then the following values are obtained:

| Activation period | Charge [μC/g] |
| --- | --- |
| 10 min | −8 |
| 30 min | −13 |
| 2 h | −20 |
| 24 h | −20 |

Comparative Example 11

For measurement using the pure styrene/acrylate toner binder, the procedure of Application Example 1 is followed but without incorporating additives by heading.

| Activation period | Charge [μC/g] |
| --- | --- |
| 10 min | −4 |
| 30 min | −12 |
| 2 h | −27 |
| 24 h | −48 |

Application Example 12

1 part of the compound from Preparation Example 1.1.1 (polyester 1) is homogenously incorporated, as described in Application Example 1, into 99 parts of a powder coating binder based on a carboxyl-containing polyester resin (®Crylcoat 430, UCB, Belgium).

To determine the deposition ratio, 30 g of the test powder coating are sprayed at a defined pressure through a triboelectric gun as described earlier. By differential weighing the quantity of powder coating deposited can be determined and a deposition ratio in % defined, and a current flow (μA) derived from the charge transfer.

| Pressure [bar] | Current [μA] | Deposition ratio [%] |
| --- | --- | --- |
| 3 | 0.8 | 30 |

Application Example 13

1.0 part of the compound from Preparation Example 1.1.4 (polyester 4) is incorporated and measured as described in Application Example 12.

| Pressure [bar] | Current [μA] | Deposition ratio [%] |
| --- | --- | --- |
| 3 | 0.7 | 30 |

Application Example 14

1.0 part of the compound from Preparation Example 1.2.1.1 (polydiallyldimethylammonium salt of polyester 1) is incorporated and measured as described in Application Example 12.

| Pressure [bar] | Current [μA] | Deposition ratio [%] |
| --- | --- | --- |
| 3 | 0.8 | 35 |

Application Example 15

1.0 part of the compound from Preparation Example 1.2.2.1 (calcium salt of polyester 3) is incorporated and measured as described in Application Example 12.

| Pressure [bar] | Current [μA] | Deposition ratio [%] |
| --- | --- | --- |
| 3 | 1.2 | 70 |

Application Example 16

A powder coating of composition

| | |
| --- | --- |
| (R)Alftalat AN 725 (carboxyl-containing polyester, Hoechst AG) | 518 parts |
| (R)Araldit PT 810 (epoxy resin, Ciba Geigy AG) | 38 parts |
| Benzoin | 3 parts |
| (R)Additol XL 496 (leveling agent, Hoechst AG) | 30 parts |
| (R)Kronos 2160 (titanium dioxide, Kronos Titan GmbH) | 300 parts |
| (R)Blanc Fixe F (barium sulfate, Sachtleben Chemie GmbH) | 100 parts |
| Calcium salt of polyester 3 | 11 parts |
| (Preparation Example 1.2.2.1) | |
| | 1000 parts | exhibits a charge flow of 0.6 μA with a deposition effect (ISO 8130 part 9) of 42%. The gel time (ISO 8130 part 6) at 180° C. is 240 sec, the subsequent gloss viewed at 60° (DIN 67 530) is 89%, and the leveling is assessed visually as 2.

Comparative Example

A powder coating of composition

| | |
| --- | --- |
| Alftalat AN 725 | 527 parts |
| Araldit PT 810 | 40 parts |
| Benzoin | 3 parts |
| Additol XL 496 | 30 parts |
| Kronos 2160 | 300 parts |
| Blanc Fixe F | 100 parts |
| | 1000 parts | exhibits a charge flow of 0.3 μA with a deposition effect of 28%. The gel time at 180° C. is 300 sec, the subsequent gloss at a viewing angle of 60° is 92%, and the leveling is assessed visually as 2.

Application Example 17

1.0 part of the compound from Preparation Example 1.2.1.4 (aluminum salt of polyester 1) is incorporated and measured as described in Application Example 1.

Instead of the styrene-acrylate copolymer a polyester resin based on bisphenol A fumarate ((R)Atlac T 500, Atlas Chemicals, Belgium) was employed, and instead of the carrier coated with styrene-methacrylate a silicone coated carrier was used (type FBM 96-110, from Powder Tech., Japan). As a function of the activation period, the following q/m values [μC/g] are measured:

| Activation period | Charge [μC/g] |
| --- | --- |
| 10 min | −12 |
| 30 min | −11 |
| 2 h | −11 |
| 24 h | −11 |

Application Example 18

1.0 part of the compound from Preparation Example 1.2.1.1 (poly(diallyldimethylammonium) salt of polyester 1) is incorporated and measured as described in Application Example 17.

| Activation period | Charge [μC/g] |
| --- | --- |
| 10 min | −16 |
| 30 min | −16 |
| 2 h | −15 |
| 24 h | −15 |

Application Example 19

1.0 part of the compound from Preparation Example 1.2.3.4 (aluminum salt of polyester 4) is incorporated and measured as described in Application Example 17.

| Activation period | Charge [μC/g] |
| --- | --- |
| 10 min | −17 |
| 30 min | −18 |
| 2 h | −18 |
| 24 h | −16 |

Application Example 20

1.0 part of the compound from Preparation Example 1.2.3.7 (perfluoroammonium salt of polyester 4) is incorporated and measured as described in Application Example 17.

| Activation period | Charge [μC/g] |
| --- | --- |
| 10 min | −8 |
| 30 min | −9 |
| 2 h | −9 |
| 24 h | −7 |

Comparative Example

For measurement using the pure polyester toner binder, the procedure of Application Example 17 is followed but without the incorporation of additives by heading.

| Activation period | Charge [μC/g] |
| --- | --- |
| 10 min | −8 |
| 30 min | −6 |
| 2 h | −4 |
| 24 h | −2 |

Application Example 21

5 g of polyethylene terephthalate (PET) granules were placed in a conical flask in which a solution had been made up beforehand from 25 ml of trifluoroacetic acid, 25 ml of methylene chloride and 50 mg of the charge control agent from Preparation Example 1.2.3.8 (perfluoroammonium salt of polyester 4). The mixture was subsequently stirred at room temperature for 60 minutes, with complete dissolution of the PET and formation of a viscous, off-white solution. This solution was then cast uniformly onto a slightly inclined glass plate of size 20 cm×20 cm and dried at room temperature in a fume cupboard for 10 hours. After this time the solvent had evaporated completely and a slightly milky layer of PET was deposited on the glass plate. To enable the layer to be detached, the plate was placed for 30 min in a tray filled with methanol. After the detachment and drying of the layer, a PET film was formed whose thickness in the central region of the glass plate was homogenously 30 μm.

A section of film 8 cm in diameter was clamped in an annular holder and charged at 400 volts by corona charging. To measure the surface potential, one side of the film was placed on an earthed metal block and pressed against the block uniformly under the inherent weight of the holder. On the other side of the film, the surface potential was measured using an electrostatic voltmeter (Monroe Electronics Inc., model 244). After 30 min the film still had a residual charge of 150 volts.

Comparative Example

As described above, PET films with and without the addition of charge control agent from Preparation Example 1.2.3.8 were produced, were clamped in holders and were attached to earthed metal blocks. To investigate the triboelectric charging properties each film was first discharged using ionized air and then the surface was rubbed with a rubber roller. Whereas the resulting charge in the case of the unmodified PET film was −50 volts, the film modified with charge control agent showed a charge of −370 volts when subjected to the same procedure.

Application Example 22

1.0 part of the compound from Preparation Example 1.2.1.5 (guanidinium salt of polyester 1) are incorporated and measured as described in Application Example 17.

| Activation period | Charge [μC/g] |
| --- | --- |
| 10 min | −12 |
| 30 min | −13 |
| 2 h | −15 |
| 24 h | −14 |

Application Example 23

1.0 part of the compound from Preparation Example 1.2.3.11 (guanidinium salt of polyester 4) are incorporated and measured as described in Application Example 17.

| Activation period | Charge [μC/g] |
| --- | --- |
| 10 min | −11 |
| 30 min | −12 |
| 2 h | −12 |
| 24 h | −11 |

Application Example 24

1.0 part of the compound from Preparation Example 1.2.4 (calcium salt of polyester 5) are incorporated and measured as described in Application Example 1.

| Activation period | Charge [μC/g] |
| --- | --- |
| 10 min | −13 |
| 30 min | −15 |
| 2 h | −15 |
| 24 h | −14 |

Application Example 25

1.0 part of the compound from Preparation Example 1.2.4 (calcium salt of polyester 5) is incorporated and measured as described in Application Example 12.

| Pressure [bar] | Current [μA] | Deposition ratio [%] |
| --- | --- | --- |
| 3 | 0.8 | 35% |

Comparative Example

To determine the deposition ratio of the pure powder coating binder ®Crylcoat 430, the procedure of Application Example 12 is followed but without the incorporation of an additive by heading.

| Pressure [bar] | Current [μA] | Deposition ratio [%] |
| --- | --- | --- |
| 3 | 0.1 | 5 |

We claim:

1. A polymer salt whose anionic component is a polyester which comprises the product of reaction of the individual components comprising a), b) and c) and optionally d) and optionally e), where
   a) is a dicarboxylic acid or a reactive derivative of a dicarboxylic acid, being free from sulfo groups,
   b) is a difunctional aromatic, aliphatic or cycloaliphatic sulfo compound whose functional groups are hydroxyl or carboxyl, or hydroxyl and carboxyl,
   c) is an aliphatic, cycloaliphatic or aromatic diol, a polyetherdiol or a polycarbonatediol,
   d) is a polyfunctional compound of functionality>2 whose functional groups are hydroxyl or carboxyl, or hydroxyl and carboxyl, and
   e) is a monocarboxylic acid
and whose cationic component comprises metal cations, ammonium ions, immonium cations, guanidinium cations, phosphonium, arsonium or stibonium cations or a mixture of the abovementioned cations.

2. A polymer salt as claimed in claim 1, wherein the components make up
   a) from 25 to 55 mol %,
   b) from 0.1 to 15 mol %,
   c) from 10 to 60 mol %,
   d) from 0 to 40 mol %, and
   e) from 0 to 20 mol %,
of the sum of monomers a) to e) (100 mol %).

3. A polymer salt as claimed in claim 1, wherein the components make up
   a) from 40 to 50 mol %,
   b) from 0.5 to 10 mol %,
   c) from 30 to 55 mol %,
   d) from 5 to 30 mol %, and
   e) from 0 to 10 mol %,
of the sum of monomers a) to e) (100 mol %).

4. A polymer salt as claimed in claim 1, wherein the content of hydroxyl groups in the polyester is from 10 to 350 mmol of OH/100 g of polyester and the content of free or neutralized acid groups is from 5 to 350 mmol of COOH or $SO_3H$/100 g of polyester.

5. A polymer salt as claimed in claim 1, wherein the content of hydroxyl groups in the polyester is from 100 to 250 mmol of OH/100 g of polyester and the content of free or neutralized acid groups is from 9 to 120 mmol of COOH or $SO_3H$/100 g of polyester.

6. A polymer salt as claimed in claim 1, wherein component a) is oxalic acid, malonic acid, glutaric acid, adipic acid, pimelic acid, azelaic acid, sebacic acid, fumaric acid, maleic acid, itaconic acid, 1,3-cyclo-pentanedicarboxylic acid, 1,2-cyclohexanedicarboxylic acid, 1,3-cyclohexanedicarboxylic acid, 1,4-cyclohexanedicarboxylic acid, phthalic acid, terephthalic acid, isophthalic acid, 2,5-norbornane-dicarboxylic acid, 1,4-naphthalenedicarboxylic acid, biphenyldicarboxylic acid, 4,4'-sulfonyldibenzoic acid or 2,5-naphthalenedicarboxylic acid or an ester or an anhydride or a mixture of two or more of the compounds mentioned.

7. A polymer salt as claimed in claim 1, wherein component b) is a sulfoisophthalic acid, sulfoterephthalic acid, sulfophthalic acid, sulfosalicylic acid, sulfosuccinic acid, an alkyl ester or a sodium salt of the sulfo acids mentioned or a mixture of two or more of the compounds mentioned.

8. A polymer salt as claimed in claim 1, wherein component c) is ethylene glycol, 1,2-propanediol, 1,3-propanediol, 2,2-dimethyl-1,3-propandiol, 1,3-butanediol, 1,4-butanediol, 1,5-pentanediol, 1,6-hexanediol, 2,2,4-trimethyl- 1,6-hexanediol, 1,2-cyclohexanedimethanol, 1,3-cyclohexanedimethanol, 1,4-cyclohexanedimethanol, 2,2'-bis(4-hydroxycyclohexyl)isopropane, p-xylylenediol, 2-ethylpropanediol or 2-butylpropanediol, a poly(oxytetramethylene) glycol, poly(oxyethylene) glycol, poly(oxypropylene) glycol or a reaction product of propane-1,3-diol, butane-1,4-diol, hexane-1,6-diol, diethylene glycol, triethylene glycol, 1,4-bis(hydroxymethyl)cyclohexane, 2,2-bis(4-hydroxycyclohexyl)propane or neopentylglycol with dimethyl carbonate, diethyl carbonate, diphenyl carbonate or with phosgene, or a mixture of two or more of the compounds mentioned.

9. A polymer salt as claimed in claim 1, wherein component d) is trimethylolpropane, trimethylolethane, glycerol, ditrimethylolpropane, pentaerythritol, dipentaerythritol, a bishydroxyalkanecarboxylic acid, trimellitic anhydride, a polycarbonate-polyol which is the reaction product of the components comprising trimethylolpropane or pentaerythritol with dimethyl, diethyl or diphenyl carbonate or a mixture of two or more of the compounds mentioned.

10. A polymer salt as claimed in claim 1, wherein component e) is a saturated or unsaturated $C_{12}$–$C_{18}$ fatty acid or a branched aliphatic $C_5$–$C_{10}$ carboxylic acid.

11. A polymer salt as claimed in claim 1, wherein the cationic component is a homo- or copolymeric pyrrolidinium cation of the formula (2)

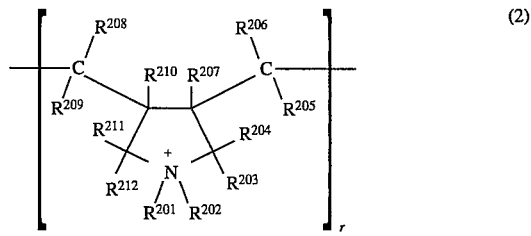

in which the radicals $R^{201}$ to $R^{212}$ independently of one another are each a hydrogen atom, halogen atom, a hydroxyl radical, an alkoxy radical, a primary, secondary or tertiary amino radical, a carboxylic acid or carboxylic ester radical, an acyl radical, a sulfonic acid or sulfonic ester radical, a cyano or nitro radical or a radical based on a $C_1$–$C_{30}$ aliphatic, $C_7$–$C_{60}$ araliphatic or $C_6$–$C_{30}$ aromatic hydrocarbon, which optionally is interrupted by heteroatoms.

12. A polymer salt as claimed in claim 1, wherein the cationic component is a homo- or copolymeric morpholinium or pyrrolidinium cation which is formed by cyclization of a diallylammonium cation of the formula (1)

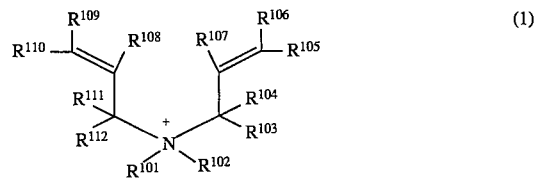

in which the radicals $R^{101}$ to $R^{112}$ independently of one another are each a hydrogen atom, halogen atom, a hydroxyl radical, an alkoxy radical, a primary, secondary or tertiary amino radical, a carboxylic acid or carboxylic ester radical, an acyl radical, a sulfonic acid or sulfonic ester radical, a cyano or nitro radical or a radical based on a $C_1$–$C_{30}$ aliphatic, $C_7$–$C_{60}$ araliphatic or $C_6$–$C_{30}$ aromatic hydrocarbon, which optionally is interrupted by heteroatoms, to form a six-membered or five-membered ring, and which is joined together by one or more divalent radicals —$SO_2$ to form a polymer, the resulting polymer cations having a molecular weight of between 500 and 5,000,000 and the ratio of the number of diallylammonium cations to the number of divalent —$SO_2$—, radicals being from 1:0.01 to 1:100.

13. A polymer salt as claimed in claim 1, wherein the cationic component is a fluorinated ammonium ion of the formula (3)

in which at least one of the radicals $R^{301}$ to $R^{302}$ is a straight-chain fluorine-containing unsaturated and/or saturated alkyl radical of 4 to 30 carbon atoms, and not more than three of the radicals $R^{301}$ to $R^{304}$ independently of one another, are hydrogen or straight-chain or branched alkyl or hydroxyalkyl radicals of 1 to 30 carbon atoms.

14. A polymer salt as claimed in claim 1, wherein the cationic component is an immonium cation of the formula (4)

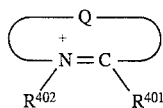 (4)

in which Q, together with the component —N=C—, is a mono- or polycyclic ring system of 4 to 17 carbon atoms which optionally is interrupted by 1 to 4 further heteroatoms and optionally contains 2 to 9 double bonds and which, in any desired position, optionally is substituted by fluorine, chlorine, bromine or iodine atoms, alkoxy($C_1$–$C_6$), alkyl($C_1$–$C_6$), nitro or amino groups, $R^{402}$ is fluorine-containing alkyl($C_1$–$C_{30}$) radical and $R^{401}$ is a hydrogen, fluorine, chlorine, bromine or iodine atom, an alkyl($C_1$–$C_6$), alkoxy($C_1$–$C_6$), nitro or amino group.

15. A polymer salt as claimed in claim 1, wherein the cationic component is a fluorinated phosphonium ion of the formula (5)

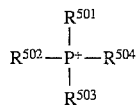 (5)

in which at least one of the radicals $R^{501}$ to $R^{504}$ is a straight-chain or branched, fluorine-substituted, saturated alkyl radical of 1 to 30 carbon atoms and 3 to 50 fluorine atoms, which optionally contains further halogen atoms, hydroxyl, chloromethyl, carboxamide, sulfonamide, urethane, keto, amino or $R^{505}$—O—$R^{506}$ groups, in which $R^{505}$ and $R^{506}$ are alkyl($C_1$–$C_{30}$) radicals, or at least one of the radicals $R^{501}$ to $R^{504}$ is a fluorine-substituted aryl radical or an aralkyl radical whose aromatic ring system is substituted by fluorine, the aryl or aralkyl radical being optionally substituted on the aromatic ring system, in addition, by saturated or unsaturated, straight-chain or branched alkyl($C_1$–$C_{30}$), alkoxy($C_1$–$C_{30}$), haloalkyl($C_1$–$C_{30}$), haloalkoxy($C_1$–$C_{30}$) or hydroxyl groups or by further halogen atoms, and, in the case of an aralkyl radical, the alkyl bridge between phosphorus atom and aromatic ring contains 1 to 30 carbon atoms, and not more than three of the radicals $R^{501}$ to $R^{504}$ independently of one another are hydrogen atoms, straight-chain or branched, unsaturated or saturated, substituted or unsubstituted alkyl radicals of 1 to 30 carbon atoms or are aryl or aralkyl radicals which optionally are substituted in the aromatic ring system by alkyl($C_1$–$C_{30}$), alkoxy($C_1$–$C_{30}$), haloalkyl($C_1$–$C_{30}$), haloalkoxy($C_1$–$C_{30}$) or hydroxyl groups or by halogen atoms.

16. A polymer salt as claimed in claim 1, wherein the cationic component is a cation of the formula (6), (7) or (8)

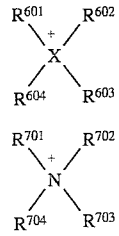

 (8)

in which X is P, As or Sb and the radicals $R^{601}$ to $R^{604}$, $R^{701}$ to $R^{704}$ and $R^{801}$ to $R^{804}$ are independently of one another each a hydrogen atom, halogen atom, a hydroxyl radical, an alkoxy radical, a primary, secondary or tertiary amino radical, a carboxylic acid or carboxylic ester radical, an acyl radical, a sulfonic acid or sulfonic ester radical, a cyano or nitro radical or a radical based on a $C_1$–$C_{30}$ aliphatic, $C_7$–$C_{60}$ aliphatic or $C_6$–$C_{30}$ aromatic hydrocarbon, which optionally are interrupted by heteroatoms.

17. A polymer salt as claimed in claim 1, wherein the cationic component is $Na^+$, $K^+$, $Ca^{2+}/2$, $Mg^{2+}/2$, $Cr^{3+}/3$, $Al^{3+}/3$, $Fe^{2+}/2$, $Fe^{3+}/3$ and $An^{2+}/2$ or a combination of these cations.

18. A process for the preparation of a polymer salt of claim 1, said process comprising:

subjecting a polyester reaction product of said components comprising a), b) and c) and optionally d) and optionally e) to an ion exchange reaction with an aqueous solution of a salt of a said cationic component, said polyester reaction product being in a dispersion, in an aqueous solution optionally containing up to 15% by weight of an organic solvent, or in solution in an organic solvent, during said ion exchange reaction.

19. A polymer salt as claimed in claim 1, wherein a said ammonium ion is a diallyl-ammonium ion, a pyrrolidinium ion, a morpholinium ion, a fluorinated ammonium ion of the formula (3)

 (3)

in which at least one of the radicals $R^{301}$ to $R^{302}$ is a straight-chain fluorine-containing unsaturated and/or saturated alkyl radical of 4 to 30 carbon atoms, and not more than three of the radicals $R^{301}$ to $R^{304}$ independently of one another, are hydrogen or straight-chain or branched alkyl or hydroxyalkyl radicals of 1 to 30 carbon atoms or a cation of the formula (7)

 (7)

in which the radicals $R^{701}$ to $R^{704}$ are independently of one another each a hydrogen atom, a hydroxy radical, an alkoxy radical, a primary secondary or tertiary amino radical, a carboxylic acid or carboxylic ester radical, an acyl radical, a sulfonic acid or sulfonic ester radical, a cyano or nitro radical or a radical based on a $C_1$–$C_{30}$ aliphatic, $C_7$–$C_{60}$ araliphatic or $C_6$–$C_{30}$ aromatic hydrocarbon, which optionally are interrupted by heteroatoms.

* * * * *